(12) United States Patent
Fang et al.

(10) Patent No.: US 11,949,141 B2
(45) Date of Patent: Apr. 2, 2024

(54) PHASE SHIFTER AND LIQUID CRYSTAL ANTENNA

(71) Applicant: BOE TECHNOLOGY GROUP CO., LTD., Beijing (CN)

(72) Inventors: Jia Fang, Beijing (CN); Hai Yu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 598 days.

(21) Appl. No.: 17/256,154

(22) PCT Filed: May 22, 2020

(86) PCT No.: PCT/CN2020/091756
§ 371 (c)(1),
(2) Date: Dec. 24, 2020

(87) PCT Pub. No.: WO2020/233697
PCT Pub. Date: Nov. 26, 2020

(65) Prior Publication Data
US 2021/0265713 A1    Aug. 26, 2021

(30) Foreign Application Priority Data
May 23, 2019    (CN) .......................... 201910436012.1

(51) Int. Cl.
*H01P 1/18* (2006.01)
*G02F 1/13* (2006.01)
*H01Q 3/36* (2006.01)

(52) U.S. Cl.
CPC .............. *H01P 1/18* (2013.01); *G02F 1/1313* (2013.01); *H01Q 3/36* (2013.01)

(58) Field of Classification Search
CPC .......... H01P 1/18; H01P 1/184; G02F 1/1313; H01Q 3/36; H01Q 9/0457
See application file for complete search history.

(56) References Cited

U.S. PATENT DOCUMENTS 6,377,134 B1 * 4/2002 Takenaka .................. H01P 5/10
333/161
2002/0051334 A1    5/2002 Zhu
(Continued)

FOREIGN PATENT DOCUMENTS

CN    105308789 A    2/2016
CN    208655852 U    3/2019
(Continued)

OTHER PUBLICATIONS

China Patent Office, First Office Action dated Oct. 19, 2020 for application No. CN201910436012.1.

*Primary Examiner* — Seung H Lee
(74) *Attorney, Agent, or Firm* — HOUTTEMAN LAW LLC (57) ABSTRACT

A phase shifter is provided to include: a first substrate, a second substrate, a dielectric layer, a transmission line, a ground electrode and at least one auxiliary electrode, where the first substrate and the second substrate are opposite to each other, the dielectric layer is between the first substrate and the second substrate, the transmission line is between the second substrate and the dielectric layer, the auxiliary electrode is between the first substrate and the dielectric layer, and the ground electrode is on a side of the second substrate distal to the dielectric layer; a dielectric constant of the dielectric layer changes with a voltage between the auxiliary electrode and the transmission line; an orthographic projection of the transmission line on the first substrate overlaps with an orthographic projection of the auxiliary electrode on the first substrate.

17 Claims, 4 Drawing Sheets

(56) References Cited

U.S. PATENT DOCUMENTS

2007/0001786 A1* 1/2007 Kundu ................. H03H 7/1708
333/204
2015/0380789 A1* 12/2015 Jakoby ................... H01P 1/184
343/905

FOREIGN PATENT DOCUMENTS

CN 110137636 A 8/2019
JP 2003008310 A 1/2003

* cited by examiner

PHASE SHIFTER AND LIQUID CRYSTAL ANTENNA

CROSS REFERENCE TO RELATED APPLICATIONS

The present application claims the priority of the Chinese Patent Application No. 201910436012.1 filed on May 23, 2019, the content of which is incorporated herein by reference in its entirety.

TECHNICAL FIELD

The present disclosure relates to the technical field of communication, in particular to a phase shifter and a liquid crystal antenna.

BACKGROUND

A liquid crystal antenna has advantages of low profile, low cost and pure electric control scanning, a phase shifting portion in the existing liquid crystal antenna adopts an inverted micro-strip line structure, which requires that a thickness of a liquid crystal layer is usually not less than 100 μm, and thus results in poor process compatibility and slow system response. If the thickness of the liquid crystal layer is directly reduced, a loss of microwave signals on metal is greatly increased.

SUMMARY

The present disclosure provides a phase shifter and a liquid crystal antenna.

The present disclosure provides a phase shifter, including: a first substrate, a second substrate, a dielectric layer, a transmission line, a ground electrode and at least one auxiliary electrode, where the first substrate and the second substrate are opposite to each other, the dielectric layer is between the first substrate and the second substrate, the transmission line is between the second substrate and the dielectric layer, the auxiliary electrode is between the first substrate and the dielectric layer, and the ground electrode is on a side of the second substrate distal to the dielectric layer; a dielectric constant of the dielectric layer changes with a voltage between the auxiliary electrode and the transmission line;

an orthographic projection of the transmission line on the first substrate overlaps with an orthographic projection of the auxiliary electrode on the first substrate, and a portion of the orthographic projection of the transmission line on the first substrate exceeds the orthographic projection of the auxiliary electrode on the first substrate.

In some implementations, the at least one auxiliary electrode includes a plurality of auxiliary electrodes sequentially arranged at intervals along an extension direction of the transmission line;

the transmission line includes a plurality of first transmission parts and a plurality of second transmission parts, where the plurality of first transmission parts and the plurality of second transmission parts are alternately one by one along the extension direction of the transmission line; the plurality of first transmission parts are in one-to-one correspondence with the plurality of auxiliary electrodes, and an orthogonal projection of the first transmission part on the first substrate does not exceed an orthogonal projection of the auxiliary electrode corresponding to the first transmission part on the first substrate In some implementations, the second substrate has a thickness between 100 μm and 10 mm.

In some implementations, the dielectric layer is a liquid crystal layer.

In some implementations, the phase shifter further includes a first bias electrode electrically coupled to the at least one auxiliary electrode, the phase shifter further includes a second bias electrode electrically coupled to the transmission line;

the first bias electrode is between the first substrate and the auxiliary electrode, and the second bias electrode is between the second substrate and the transmission line.

In some implementations, a material of the first and second bias electrodes each includes indium tin oxide.

In some implementations, the first and second bias electrodes each have a thickness between 100 nm and 10 μm.

In some implementations, the at least one auxiliary electrode is grounded.

In some implementations, the phase shifter further includes a plurality of reference electrodes electrically coupled to the plurality of auxiliary electrodes in a one-to-one correspondence; where the plurality of reference electrodes are insulated and separated from the ground electrode, and an orthographic projection of each of the plurality of reference electrodes on the second substrate at least partially overlaps with an orthographic projection of the ground electrode on the second substrate.

In some implementations, the phase shifter further includes a plurality of high resistance wires in one-to-one correspondence with the plurality of auxiliary electrodes; where each of the plurality of reference electrodes is electrically coupled with a corresponding auxiliary electrode through a corresponding high resistance wire; and each of the high resistance wires is a wire with an impedance value on an order of kilo-ohms.

In some implementations, the plurality of reference electrodes, the plurality of high resistance wires and the plurality of auxiliary electrodes are in a same layer; and orthographic projections of the plurality of reference electrodes and the plurality of high resistance wires on the first substrate are on a side in a width direction, perpendicular to the extension direction of the transmission line, of an orthographic projection of the transmission line on the first substrate.

In some implementations, each of the reference electrodes is a bulk metal.

In some implementations, the at least one auxiliary electrode includes a plurality of auxiliary electrodes coupled to the ground electrode through a plurality of connection members, respectively, each of the plurality of connection members penetrates through the dielectric layer and the second substrate and is insulated and separated from the transmission line.

In some implementations, each of the connection members includes a first connection part and a second connection part; the first connection part is coupled with a corresponding auxiliary electrode; and the second connection part is electrically coupled to the ground electrode through a via penetrating through the dielectric layer and the second substrate.

In some implementations, the first connection part is a high resistance wire which is in a same layer and has a same material as the auxiliary electrode; and the high resistance wire is a wire with an impedance value on an order of kilo-ohms; and orthographic projections of the plurality of connection members on the first substrate are on a side in a width direction, perpendicular to the extension direction of the transmission line, of an orthographic projection of the transmission line on the first substrate.

Correspondingly, the present disclosure further provides a liquid crystal antenna including the phase shifter provided by the present disclosure.

In some implementations, a via corresponding to the transmission line is provided on the ground electrode, a third substrate is provided on a side of the ground electrode distal to the first substrate, and a patch electrode corresponding to the via is provided on a side of the third substrate distal to the first substrate.

BRIEF DESCRIPTION OF DRAWINGS

The accompanying drawings are used to provide a further understanding of the present disclosure and constitute a part of the specification, and are used to interpret the present disclosure together with the following specific embodiments, but do not constitute a limitation to the present disclosure. In the drawings:

FIG. 6b is a cross-sectional view taken along AA line of FIG. 6a;

FIG. 7b is a cross-sectional view taken along BB line of FIG. 7a;

DETAIL DESCRIPTION OF EMBODIMENTS

The specific embodiments of the present disclosure will be described in detail below with reference to the accompanying drawings. It should be understood that the specific embodiments described herein are merely used to illustrate and explain the present disclosure, and are not used to limit the present disclosure.

Figure 1:
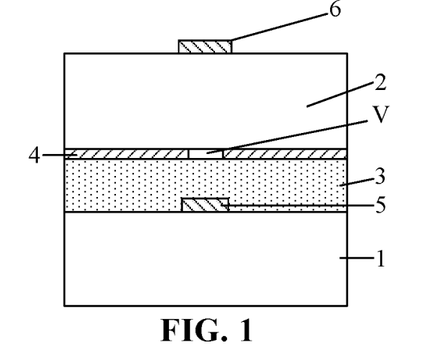
FIG. 1 is a schematic structural diagram of a liquid crystal antenna in the related art.

FIG. 1 is a schematic structural diagram of a liquid crystal antenna in the related art. As shown in FIG. 1, a phase shifter includes a first substrate 1, a second substrate 2, a liquid crystal layer 3 disposed between the first substrate 1 and the second substrate 2, a ground electrode 4 disposed between the second substrate 2 and the liquid crystal layer 3, a feed line 5 disposed between the first substrate 1 and the liquid crystal layer 3, and a patch electrode 6 disposed on a side of the second substrate 2 distal to the liquid crystal layer 3. The ground electrode 4 is provided with a via V therein. When a microwave signal is transmitted in the liquid crystal layer 3, liquid crystal molecules are deflected by adjusting a voltage between the ground electrode 4 and the feed line 5, so that a dielectric constant of the liquid crystal layer 3 is changed accordingly, and a phase of the microwave signal is adjusted. The patch electrode 6 receives the microwave signal with the changed phase through the via V and transmits the microwave signal.

In the structure of FIG. 1, if a thickness of the liquid crystal layer 3 is too small, it would result in a large loss of the microwave signal on a metal such as the feed line 5 and the ground electrode 4. Generally, the thickness of the liquid crystal layer 3 is not less than 100 μm, and current processes in the production line are suitable for manufacturing products with relative thin liquid crystal layers, so compatibility between the structure of FIG. 1 and the current processes is poor. When the thickness of the liquid crystal layer 3 is relative large, an entire deflection speed of the liquid crystal molecules is slow, and a response time of a system is reduced.

Figure 2:
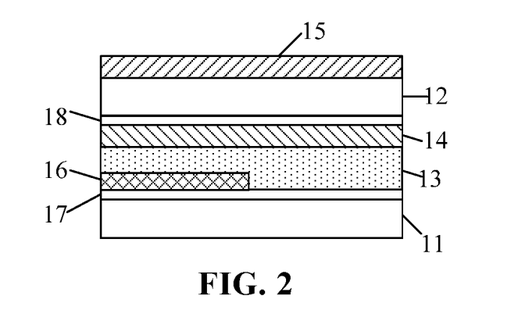
FIG. 2 is a schematic structural diagram of a phase shifter according to an embodiment of the present disclosure.

FIG. 2 is a schematic structural diagram of a phase shifter according to an embodiment of the present disclosure. As shown in FIG. 2, the phase shifter includes: a first substrate 11, a second substrate 12, a dielectric layer 13, a transmission line 14, a ground electrode 15, and at least one auxiliary electrode 16. The first substrate 11 and the second substrate 12 are disposed opposite to each other, the dielectric layer 13 is disposed between the first substrate 11 and the second substrate 12, the transmission line 14 is disposed between the second substrate 12 and the dielectric layer 13, the auxiliary electrode 16 is disposed between the first substrate 11 and the dielectric layer 13, and the ground electrode 15 is disposed on a side of the second substrate 12 distal to the dielectric layer 13. A dielectric constant of the dielectric layer 13 changes with a voltage between the auxiliary electrode 16 and the transmission line 14.

An orthographic projection of the transmission line 14 on the first substrate 11 overlaps with an orthographic projection of the auxiliary electrode 16 on the first substrate 11, and a portion of the orthographic projection of the transmission line 14 on the first substrate 11 exceeds the orthographic projection of the auxiliary electrode 16 on the first substrate 11. That is, the auxiliary electrode 16 overlaps with the transmission line 14 in a thickness direction of the first substrate 11, and an overlapping region of the transmission line 14 and the auxiliary electrode 16 forms a variable capacitor; and a portion of the transmission line 14 exceeding the auxiliary electrode 16 is equivalent to an inductor. When a phase of a microwave signal is adjusted by using the phase shifter, the variable capacitor is grounded, and the transmission line 14 is coupled in parallel with the variable capacitor, and an equivalent circuit of the phase shifter of FIG. 2 is shown in FIG. 3.

Figure 3:
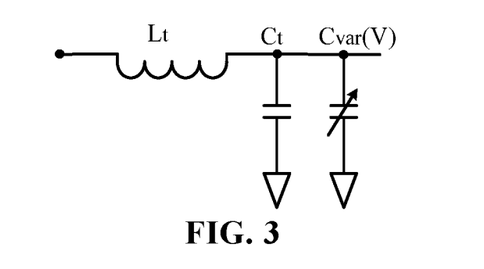
FIG. 3 is an equivalent circuit diagram of the phase shifter of FIG. 2.

In FIG. 3, $L_t$ represents an equivalent inductor of the portion of the transmission line 14 of FIG. 2 exceeding the auxiliary electrode 16 (referred to as an invariable portion of the transmission line); $C_t$ represents an equivalent capacitor between the portion of the transmission line 14 exceeding the auxiliary electrode 16 (referred to as the invariable portion of the transmission line) and the ground electrode 15; $C_{var}(V)$ is the variable capacitor between the overlapping portion of the transmission line 14 and the auxiliary electrode 16 (referred to as a variable portion of the transmission line) and the auxiliary electrode 16. When a microwave signal is transmitted in the phase shifter of FIG. 2, a phase velocity $V_{phase}$ is calculated according to following equation (1):

$$V_{phase} = \frac{1}{\sqrt{L_l(C_l + C_{var}(V)/L_{sect})}} \quad (1)$$

Where $L_l$ represents an equivalent inductance of the portion of the transmission line 14 exceeding the auxiliary electrode 16 (the invariable portion of the transmission line) per unit length; $C_l$ represents an equivalent capacitance between the portion of the transmission line 14 exceeding the auxiliary electrode 16 (the invariable portion of the transmission line) and the ground electrode 15 per unit length; $C_{var}$ represents a capacitance of the variable capacitor; $L_{sect}$ represents a sum of a physical length of each auxiliary electrode 16 corresponding to the transmission line 14 (a physical length of the variable portion of the transmission line 14) and a physical length of the portion of the transmission line 14 exceeding each auxiliary electrode 16 (a physical length of the invariable portion of the transmission line 14). As shown in FIG. 2, in a case where the phase shifter includes only one auxiliary electrode 16, $L_{sect}$ represents a total length of the transmission line; V is a voltage difference applied between the auxiliary electrode 16 and the transmission line 14.

When the variable capacitance is changed, a phase change amount ΔØ of the microwave signal may be obtained according to following formula (2):

$$\Delta\phi = 360° \cdot f \cdot L_{tot}\left(\frac{1}{V_1} - \frac{1}{V_2}\right) \quad (2)$$

Where $V_1$ and $V_2$ are phase velocities before and after the variable capacitance is changed, respectively, $L_{tot}$ is a length of an equivalent composite transmission line of the phase shifter. In the phase shifter as shown in FIG. 2, in a case where the phase shifter includes only one auxiliary electrode 16, $L_{sect}$ is equal to $L_{tot}$, f is a center frequency of the phase shifter that is a center frequency point of a frequency band in which the phase shifter is to be operated. For example, the phase shifter is operated in a frequency band in a range of 11 GHz to 12 GHz, the center frequency is 11.5 GHz, which depends on the required frequency range.

In the related art shown in FIG. 1, the liquid crystal layer 3 serves as a medium for transmitting the microwave, and the change in the dielectric constant thereof changes a wavelength of the microwave transmitted therein, thereby causing a change in the phase of the microwave; in the present disclosure, as can be seen from the above description and formulas (1) and (2), the microwave signal propagates along the transmission line 14, and the second substrate 12 serves as a medium for transmitting the microwave signal, and the dielectric layer 13 serves as a medium for the parallel capacitor in parallel with the transmission line 14; when the microwave signal is transmitted in the second substrate 12, the dielectric constant of the dielectric layer 13 can be adjusted by the voltage between the transmission line 14 and the auxiliary electrode 16, so that a capacitance of the variable capacitor in parallel with the transmission line 14 changes, and the phase of the microwave signal changes. For example, a positive voltage is applied to the transmission line 14, a negative voltage is applied to the auxiliary electrode 16, or the auxiliary electrode 16 is grounded. Since the dielectric layer 13 does not serve as a transmission medium for the microwave signal, the thickness of the dielectric layer 13 does not affect the loss of the microwave signal, and thus, when the process compatibility and the response speed are improved by reducing the thickness of the dielectric layer 13, the loss of the microwave signal is not increased.

The materials of the ground electrode 15, the transmission line 14, and the auxiliary electrode 16 may include low-resistance and low-loss metals such as copper, gold, silver, and aluminum, and may be manufactured by magnetron sputtering, thermal evaporation, and electroplating and the like. The first substrate 11 and the second substrate 12 may be made of insulating plates such as a teflon glass fiber laminate, a phenolic paper laminate, and a phenolic glass cloth laminate, or may be made of hard plates such as quartz and glass with low loss.

In some implementations, a thickness of the second substrate 12 may be between 100 μm and 10 mm to reduce the loss of the microwave signal. A thickness of the first substrate 11 may be between 100 μm and 10 mm.

In some implementations, the dielectric layer 13 is a liquid crystal layer. A deflection angle of the liquid crystal molecules is adjusted by adjusting the voltage between the transmission line 14 and the auxiliary electrode 16, thereby changing the dielectric constant of the liquid crystal layer.

In some implementations, the thickness of the liquid crystal layer is between 3 μm and 5 μm. Because the thickness of the liquid crystal layer is relative small, the entire deflection speed of liquid crystal molecules in the liquid crystal layer can be improved, such that a speed for adjusting the variable capacitor is improved, a speed for adjusting the phase of the microwave signal is further improved, and the response speed of a system is further improved.

Figure 4:
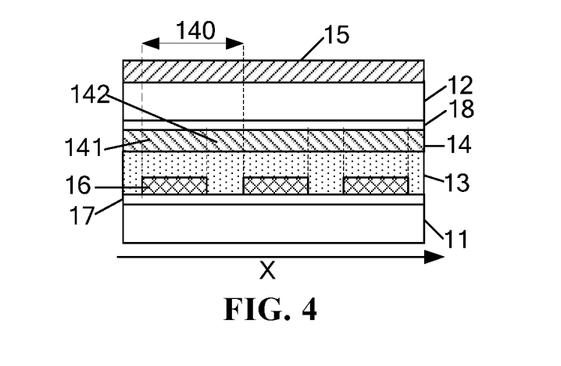
FIG. 4 is a schematic structural diagram of a phase shifter according to an embodiment of the present disclosure.

In order to increase a phase shift range of the phase shifter, as shown in FIG. 4, the phase shifter includes a plurality of auxiliary electrodes 16, and the plurality of auxiliary electrodes 16 are sequentially arranged at intervals in an extension direction of the transmission line 14. The transmission line 14 includes: a plurality of first transmission parts 141 and a plurality of second transmission parts 142 alternately arranged one by one along an extension direction of the transmission line 14. The plurality of first transmission parts 141 are in one-to-one correspondence with the plurality of auxiliary electrodes 16, and an orthogonal projection of the first transmission part 141 on the first substrate 11 does not exceed an orthogonal projection of the auxiliary electrode 16 corresponding to the first transmission part 141 on the first substrate 11. The plurality of first transmission parts 141 and the plurality of second transmission parts 142, and the plurality of auxiliary electrodes 16 are provided, and in this case, the phase shifter can be regarded as including a plurality of phase shift units each having the structure and the equivalent circuit shown in FIGS. 2 and 3. In the phase shifter including the plurality of phase shift units, a plurality of variable capacitors having a same size are correspondingly formed, and the equivalent inductances of the second transmission parts 142 are also the same. That is, a transmission unit 140 formed by one first transmission part 141 and one second transmission part 142 forms an equivalent circuit similar to that having the phase shifter shown in FIG. 3 with the auxiliary electrode 16 which is provided oppositely and correspondingly to the transmission unit 140.

Figure 5A:
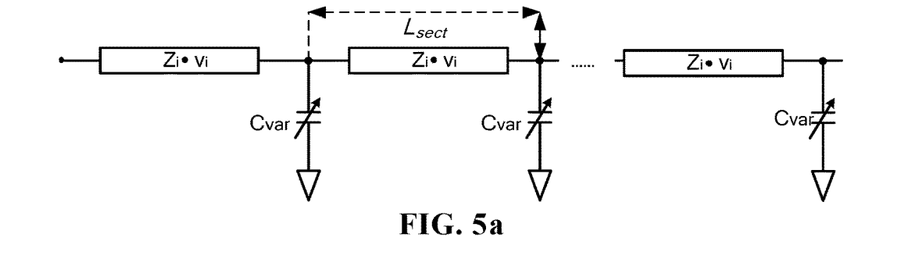
FIG. 5a is a schematic diagram of an equivalent model of the phase shifter in FIG. 4.
Figure 5B:
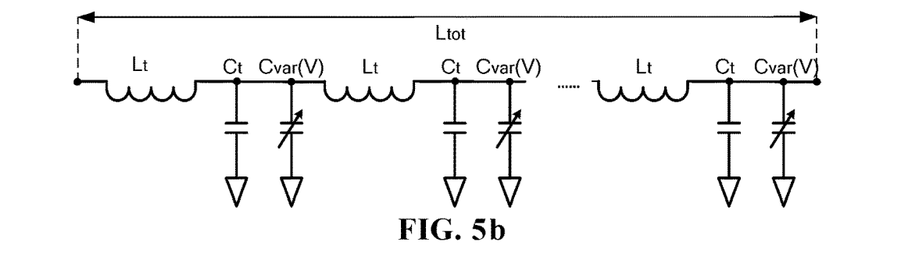
FIG. 5b is an equivalent circuit diagram of the phase shifter of FIG. 4.
Figure 5C:
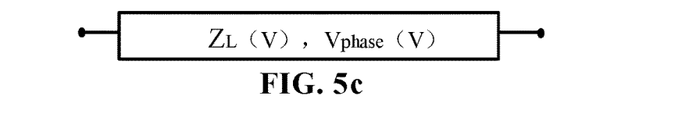
FIG. 5c is a schematic diagram of an equivalent composite transmission line of the phase shifter of FIG. 4.

Thus, it is equivalent to the transmission line 14 being periodically loaded with a variable capacitance. An equivalent model of the phase shifter is shown in FIG. 5a, an equivalent circuit of the phase shifter is shown in FIG. 5b, and an equivalent composite transmission line of the phase shifter is shown in FIG. 5c. An impedance of the equivalent composite transmission line is $Z_L(V)$. In FIG. 5b, $L_t$ represents an equivalent inductor of a portion (i.e., the second transmission part 142) of each transmission unit (one first transmission part 141 and one second transmission part 142) of FIG. 4 exceeding its corresponding auxiliary electrode 16; $C_t$ represents an equivalent capacitor between a portion (i.e., the second transmission part 142) of each transmission unit exceeding its corresponding auxiliary electrode 16 and the ground electrode 15; $C_{var}$ (V) is an equivalent capacitor between each transmission unit and the auxiliary electrode 16; V represents a voltage difference between the transmission line 14 and the auxiliary electrode 16. When the microwave signal is transmitted in the phase shifter in FIG. 4, the phase velocity is also calculated according to the above formula (1), where $L_l$ represents the equivalent inductor of the part of the transmission line 142 per unit length in each transmission unit 140 in FIG. 4; when the capacitance value of the variable capacitor changes, the phase change of the microwave signal is calculated according to the above formula (2). $L_{sect}$ in formula (1) represents a sum of a physical length of the transmission line 14 corresponding to each auxiliary electrode 16 (a physical length of the first transmission part 141) and a physical length of the portion of the transmission line 14 exceeding each auxiliary electrode 16 (a physical length of the second transmission part 142), that is, a length of the transmission line 14 in each transmission unit 140 (i.e., a length of the transmission unit 140 in a length direction X in FIG. 4). As shown in FIG. 4, when the phase shifter includes a plurality of auxiliary electrodes 16, $L_{sect}$ is a length of a part of the transmission line for each auxiliary electrode 16. In FIG. 4, $L_{sect}$ is a length of each transmission unit 140 for each auxiliary electrode 16, for example, as shown in FIG. 5a.

As shown in FIG. 5b, $L_{tot}$ in formula (2) is a length of the transmission line in the entire phase shifter. In a case where a total phase change amount of the phase shifter is required, a total length Ltot of the phase shifter is determined by determining the number of the transmission units of the phase shifter (the length of each transmission unit is Lsect). For example, if a phase change amount of each transmission unit (Lsect) is approximately 30°, and the length Lsect of the transmission unit is 1 mm, a total phase change amount of 360° corresponds to the length Lsect of 12 transmission units, and the total length Lsect of the transmission unit is 12 mm.

Note that, an orthogonal projection of the first transmission unit 141 on the first substrate 11 may be coincided with an orthogonal projection of the auxiliary electrode 16 corresponding to the first transmission unit 141 on the first substrate 11; it is also possible that the orthographic projection of the auxiliary electrode 16 on the first substrate 11 exceed the orthographic projection of the first transmission part 141 on the first substrate 11. For example, both ends of the auxiliary electrode 16 in a width direction Y of the transmission line 14 exceed the transmission line 14.

In order to facilitate to supply voltages to the transmission line 14 and the auxiliary electrode 16, the phase shifter further includes a first bias electrode 17 and a second bias electrode 18, as shown in FIGS. 2 and 4. The first bias electrode 17 is electrically coupled to each auxiliary electrode 16, and the first bias electrode 17 may be particularly disposed between the first substrate 11 and each auxiliary electrode 16. The second bias electrode 18 is electrically coupled to the transmission line 14, and the second bias electrode 18 may be disposed between the second substrate 12 and the transmission line 14.

In some implementations, the first bias electrode 17 and the second bias electrode 18 may be made of a material having a high resistivity, for example, the material of each of the first bias electrode 17 and the second bias electrode 18 includes indium tin oxide. The first bias electrode 17 and the second bias electrode 18 are made of a material having a high resistivity in order to transmit the microwave signal as much as possible in the second substrate 12.

A thickness of each of the first bias electrode 17 and the second bias electrode 18 is between 100 nm and 10 μm. The first bias electrode 17 and the second bias electrode 18 may be manufactured by magnetron sputtering, chemical vapor deposition, thermal evaporation, or the like.

Figure 6A:
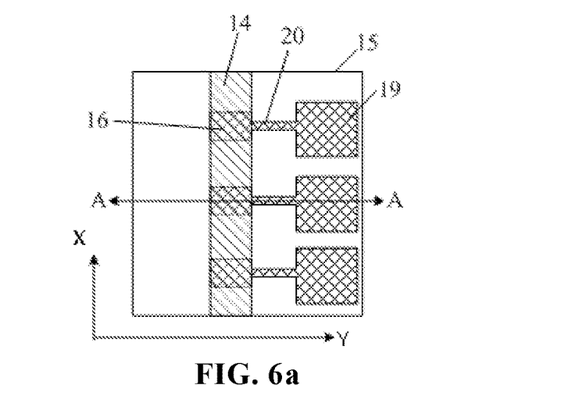
FIG. 6a is a top view of an auxiliary electrode in a first grounding mode.

In some implementations, the auxiliary electrode 16 is grounded to prevent the variable capacitor from floating. A first grounding mode of the auxiliary electrode is shown with reference to FIGS. 6a and 6b, and a second grounding mode of the auxiliary electrode is shown with reference to FIGS. 7a and 7 b. FIG. 6a and FIG. 7a are top views, and the ground electrode 15, the second substrate 12, and the dielectric layer 13 are all shown in transparent structures, in order to clearly show relative positions of structures such as the auxiliary electrode 16, the transmission line 14 and the like.

Figure 6B:
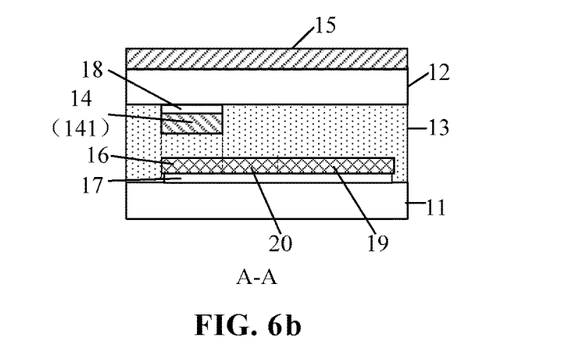
Figure 7A:
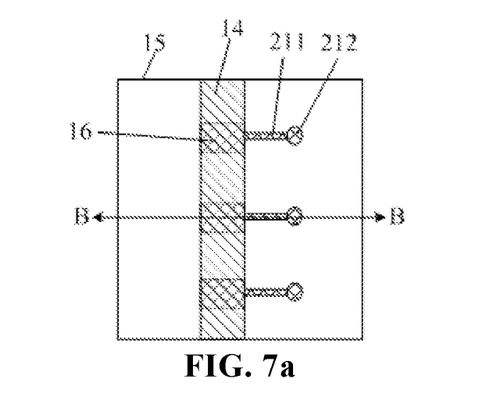
FIG. 7a is a top view of the auxiliary electrode in a second grounding mode.

In the first grounding mode of the auxiliary electrode 16, as shown in FIGS. 6a and 6b, the phase shifter further includes a plurality of reference electrodes 19 electrically coupled to the plurality of auxiliary electrodes 16 in a one-to-one correspondence; each reference electrodes 19 are insulated and separated from the ground electrode 15, and an orthographic projection of each reference electrode 19 on the second substrate 12 at least partially overlaps with an orthographic projection of the ground electrode 15 on the second substrate 12. The reference electrode 19 may be a metal electrode having a large area.

The orthographic projection of each reference electrode 19 on the second substrate 12 is on a side of the transmission line 14 in a width direction Y thereof, the auxiliary electrode 16 may be coupled to the corresponding reference electrode 19 through a high resistance wire 20 (i.e., a wire having an impedance value on an order of kilo-ohms). In actual production, the high impedance can be achieved by reducing a width of the wire. The high impedance wire 20 is provided to ensure that the microwave signal can be transmitted along the transmission line 14 and is prevented from deviating from the transmission line 14 during the transmission.

The reference electrodes 19, the high resistance wires 20 and the auxiliary electrodes 16 are disposed in a same layer and made of a same material. During manufacturing, the reference electrodes 19, the high resistance wires 20 and the auxiliary electrodes 16 can be manufactured by a single process to simplify the manufacturing process.

Figure 6C:
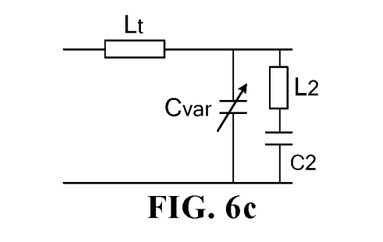
FIG. 6c is an equivalent circuit diagram of the auxiliary electrode in the first grounding mode.

In the first grounding mode of the auxiliary electrode 16, the reference electrode 19, a portion of the ground electrode 15 directly facing the reference electrode 19, and the dielectric layer between the reference electrode 19 and the ground electrode 15 form a capacitor to ground, and when a capacitance of the capacitor to ground is relative large, an effect of virtual common ground can be achieved. FIG. 6c shows an equivalent circuit of this grounding mode, where $L_t$ is an equivalent inductor of the second transmission part 142 of the transmission line 14 in one transmission unit, and $C_{var}$ is the variable capacitor described above; $L_2$ is an inductor formed by the high resistance wire 20; $C_2$ is the capacitor to ground described above.

Figure 7B:
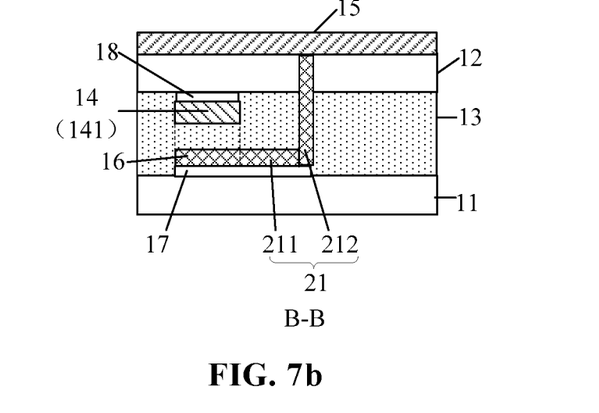

In the second grounding mode of the auxiliary electrode 16, the auxiliary electrode 16 may be grounded through the ground electrode 15. As shown in FIGS. 7a and 7b, the auxiliary electrode 16 is coupled to the ground electrode 15 through a connection member 21, and the connection member 21 penetrates through the dielectric layer 13 and the second substrate 12 and is insulated and separated from the transmission line 14.

The connection member 21 includes a first connection part 211 and a second connection part 212, and the first connection part 211 may adopt the same high resistance wire as that in FIG. 6b, and is disposed in a same layer and has a same material as the auxiliary electrode 16. The second connection part 212 is coupled to the ground electrode 15 through a via penetrating through the dielectric layer 13 and the second substrate 12.

Figure 7C:
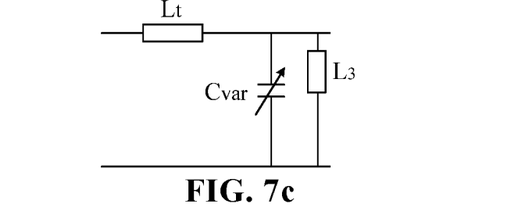
FIG. 7c is an equivalent circuit diagram of the auxiliary electrode in the second grounding mode.

An equivalent circuit of this grounding mode is shown in FIG. 7c, where $L_t$ is an equivalent inductor of the second transmission part 142 of the transmission line 14 in one transmission unit, and $C_{var}$ is the variable capacitor described above; $L_3$ is an equivalent inductor of the connection member 21.

Figure 8:
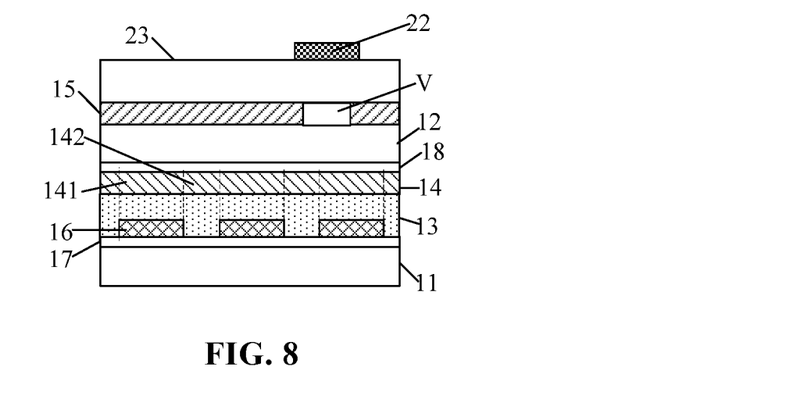
FIG. 8 is a schematic diagram of a liquid crystal antenna according to an embodiment of the present disclosure.

FIG. 8 is a schematic diagram of a liquid crystal antenna according to an embodiment of the present disclosure, which includes the phase shifter in the foregoing embodiments.

As shown in FIG. 8, a via V corresponding to the transmission line 14 is disposed in the ground electrode 15, a third substrate 23 is disposed on a side of the ground electrode 15 distal to the first substrate 11, and a patch electrode 22 corresponding to the via V is disposed on a side of the third substrate 23 distal to the first substrate 11. After the phase of the microwave signal is adjusted by the phase shifter, the patch electrode 22 receives the microwave signal through the via V, and transmits the microwave signal with the changed phase at a corresponding angle; conversely, the patch electrode 22 receives a microwave signal at an angle and then feeds the microwave signal back to the phase shifter through the via V.

The patch electrode 22 may be made of low-resistance and low-loss metals such as copper, gold, silver, and aluminum, and the patch electrode 22 may be manufactured by magnetron sputtering, thermal evaporation, and electroplating.

It will be understood that the above embodiments are merely exemplary embodiments employed to illustrate the principles of the present disclosure, and the present disclosure is not limited thereto. It will be apparent to those skilled in the art that various changes and modifications may be made therein without departing from the spirit and scope of the present disclosure, and these changes and modifications are to be considered within the scope of the present disclosure.

What is claimed is:

1. A phase shifter, comprising: a first substrate, a second substrate, a dielectric layer, a transmission line, a ground electrode and at least one auxiliary electrode, wherein the first substrate and the second substrate are opposite to each other, the dielectric layer is between the first substrate and the second substrate, the transmission line is between the second substrate and the dielectric layer, the auxiliary electrode is between the first substrate and the dielectric layer, and the ground electrode is on a side of the second substrate distal to the dielectric layer; a dielectric constant of the dielectric layer changes with a voltage between the auxiliary electrode and the transmission line;

an orthographic projection of the transmission line on the first substrate overlaps with an orthographic projection of the auxiliary electrode on the first substrate, and a portion of the orthographic projection of the transmission line on the first substrate exceeds the orthographic projection of the auxiliary electrode on the first substrate;

wherein the at least one auxiliary electrode comprises a plurality of auxiliary electrodes sequentially arranged at intervals along an extension direction of the transmission line;

the transmission line comprises a plurality of first transmission parts and a plurality of second transmission parts, wherein the plurality of first transmission parts and the plurality of second transmission parts are alternately arranged one by one along the extension direction of the transmission line; the plurality of first transmission parts are in one-to-one correspondence with the plurality of auxiliary electrodes, and an orthogonal projection of the first transmission part on the first substrate does not exceed an orthogonal projection of the auxiliary electrode corresponding to the first transmission part on the first substrate; and the phase shifter further comprises a plurality of reference electrodes electrically coupled to the plurality of auxiliary electrodes in a one-to-one correspondence; wherein the plurality of reference electrodes are insulated and separated from the ground electrode, and an orthographic projection of each of the plurality of reference electrodes on the second substrate at least partially overlaps with an orthographic projection of the ground electrode on the second substrate.

2. The phase shifter of claim 1, wherein the second substrate has a thickness between 100 μm and 10 mm.

3. The phase shifter of claim 1, wherein the dielectric layer is a liquid crystal layer.

4. The phase shifter of claim 1, further comprising a first bias electrode electrically coupled to the at least one auxiliary electrode, wherein the phase shifter further comprises a second bias electrode electrically coupled to the transmission line; the first bias electrode is between the first substrate and the auxiliary electrode, and the second bias electrode is between the second substrate and the transmission line.

5. The phase shifter of claim 4, wherein a material of each of the first bias electrode and second bias electrode comprises indium tin oxide.

6. The phase shifter of claim 4, wherein the first and second bias electrodes each have a thickness between 100 nm and 10 μm.

7. The phase shifter of claim 1, wherein the at least one auxiliary electrode is grounded.

8. The phase shifter of claim 1, further comprising a plurality of high resistance wires in one-to-one correspondence with the plurality of auxiliary electrodes;

wherein each of the plurality of reference electrodes is electrically coupled to a corresponding auxiliary electrode through a corresponding high resistance wire; and each of the high resistance wires is a wire with an impedance value on an order of kilo-ohms.

9. The phase shifter of claim 8, wherein the plurality of reference electrodes, the plurality of high resistance wires and the plurality of auxiliary electrodes are in a same layer; and orthographic projections of the plurality of reference electrodes and the plurality of high resistance wires on the first substrate are on a side in a width direction of an orthographic projection of the transmission line on the first substrate.

10. The phase shifter of claim 9, wherein each of the reference electrodes is a bulk metal.

11. A phase shifter, comprising: a first substrate, a second substrate, a dielectric layer, a transmission line, a ground electrode and at least one auxiliary electrode, wherein the first substrate and the second substrate are opposite to each other, the dielectric layer is between the first substrate and the second substrate, the transmission line is between the second substrate and the dielectric layer, the auxiliary electrode is between the first substrate and the dielectric layer, and the ground electrode is on a side of the second substrate distal to the dielectric layer; a dielectric constant of the dielectric layer changes with a voltage between the auxiliary electrode and the transmission line;

an orthographic projection of the transmission line on the first substrate overlaps with an orthographic projection of the auxiliary electrode on the first substrate, and a portion of the orthographic projection of the transmission line on the first substrate exceeds the orthographic projection of the auxiliary electrode on the first substrate, wherein the at least one auxiliary electrode is grounded, and wherein the at least one auxiliary electrode comprises a plurality of auxiliary electrodes coupled to the ground electrode through a plurality of connection members, respectively, and each of the plurality of connection members penetrates through the dielectric layer and the second substrate and is insulated and separated from the transmission line.

12. The phase shifter of claim 11, wherein each of the connection members comprises a first connection part and a second connection part;

the first connection part is coupled with a corresponding auxiliary electrode; and the second connection part is electrically coupled to the ground electrode through a via penetrating through the dielectric layer and the second substrate.

13. The phase shifter of claim 12, wherein the first connection part is a high resistance wire which is in a same layer and has a same material as the auxiliary electrode; and the high resistance wire is a wire with an impedance value on an order of kilo-ohms; and orthographic projections of the plurality of connection members on the first substrate are on a side in a width direction of an orthographic projection of the transmission line on the first substrate.

14. A liquid crystal antenna, comprising a phase shifter, which comprises: a first substrate, a second substrate, a dielectric layer, a transmission line, a ground electrode and at least one auxiliary electrode, wherein the first substrate and the second substrate are opposite to each other, the dielectric layer is between the first substrate and the second substrate, the transmission line is between the second substrate and the dielectric layer, the auxiliary electrode is between the first substrate and the dielectric layer, and the ground electrode is on a side of the second substrate distal to the dielectric layer; a dielectric constant of the dielectric layer changes with a voltage between the auxiliary electrode and the transmission line;

an orthographic projection of the transmission line on the first substrate overlaps with an orthographic projection of the auxiliary electrode on the first substrate, and a portion of the orthographic projection of the transmission line on the first substrate exceeds the orthographic projection of the auxiliary electrode on the first substrate;

wherein the at least one auxiliary electrode comprises a plurality of auxiliary electrodes sequentially arranged at intervals along an extension direction of the transmission line;

the transmission line comprises a plurality of first transmission parts and a plurality of second transmission parts, wherein the plurality of first transmission parts and the plurality of second transmission parts are alternately arranged one by one along the extension direction of the transmission line; the plurality of first transmission parts are in one-to-one correspondence with the plurality of auxiliary electrodes, and an orthogonal projection of the first transmission part on the first substrate does not exceed an orthogonal projection of the auxiliary electrode corresponding to the first transmission part on the first substrate; and the phase shifter further comprises a plurality of reference electrodes electrically coupled to the plurality of auxiliary electrodes in a one-to-one correspondence; wherein the plurality of reference electrodes are insulated and separated from the ground electrode, and an orthographic projection of each of the plurality of reference electrodes on the second substrate at least partially overlaps with an orthographic projection of the ground electrode on the second substrate.

15. The liquid crystal antenna of claim 14, wherein a via corresponding to the transmission line is provided in the ground electrode, a third substrate is provided on a side of the ground electrode distal to the first substrate, and a patch electrode corresponding to the via is provided on a side of the third substrate distal to the first substrate.

16. The liquid crystal antenna of claim 14, wherein the second substrate has a thickness between 100 μm and 10 mm.

17. The liquid crystal antenna of claim 14, wherein the dielectric layer is a liquid crystal layer.

* * * * *